US006766929B2

(12) United States Patent
Karlsson (10) Patent No.: US 6,766,929 B2
(45) Date of Patent: Jul. 27, 2004

(54) LOAD CARRIER FOR ROOF RAILS

(75) Inventor: Peter Karlsson, Gnosjö (SE)

(73) Assignee: Thule Sweden AB, Hillerstorp (SE)

( * ) Notice: Subject to any disclaimer, the term of this patent is extended or adjusted under 35 U.S.C. 154(b) by 173 days.

(21) Appl. No.: 09/683,397

(22) Filed: Dec. 21, 2001

(65) Prior Publication Data

US 2002/0079341 A1 Jun. 27, 2002

(30) Foreign Application Priority Data

Dec. 21, 2000 (SE) .............................................. 0004745

(51) Int. Cl.[7] .............................................. B60R 9/00
(52) U.S. Cl. ...................... 224/319; 224/315; 224/331
(58) Field of Search ................... 224/319, 315, 224/321, 322, 324, 325, 326, 331, 318, 309, 539; 248/311.2, 229.13, 229.23, 231.51, 55

(56) References Cited

U.S. PATENT DOCUMENTS

| 4,135,573 | A | * | 1/1979 | Sutter | 165/80.1 |
| 5,275,320 | A | * | 1/1994 | Duemmler | 224/319 |
| 5,419,479 | A | * | 5/1995 | Evels et al. | 224/321 |
| 6,079,601 | A | * | 6/2000 | Murray | 224/319 |
| 6,131,781 | A | * | 10/2000 | Murray | 224/310 |
| 6,357,710 | B1 | * | 3/2002 | Fielden et al. | 248/276.1 |
| 6,491,192 | B2 | * | 12/2002 | Aki | 224/309 |

FOREIGN PATENT DOCUMENTS

EP    1008490 A1    6/2000

* cited by examiner

Primary Examiner—Gregory Vidovich
Assistant Examiner—Maerena W. Brevard
(74) Attorney, Agent, or Firm—Novak Druce LLP (57) ABSTRACT

Load carrier bar (3) intended to be attached to roof rails mounted on a vehicle roof. The roof rails having two longitudinal rails (2) disposed at a distance from and substantially parallel to each other, the load carrier bar being fitted at each of its ends with a corresponding attachment arrangement (4) intended to be connected with a corresponding rail. Each attachment arrangement includes a connecting means (5), united with the load carrier bar and adapted to be attached to the rail. A tightenable clamp joint (6) encloses the rail and which when tightened unites the load carrier bar to the rail by a rigid and immovable joint. The clamp joint possesses a locking plate (7) which at its first end is hinged to a link (8) connected to the load carrier bar and at its second end is connected with the load carrier bar by means of a demountable tensioned joint (18). An elastic element (17) is disposed about the link and ensures that the locking plate, when it is not connected with the load carrier bar by means of the tensioned joint, is retained so that its longitudinal axis is substantially parallel to the longitudinal axis of the load carrier bar.

7 Claims, 7 Drawing Sheets

LOAD CARRIER FOR ROOF RAILS

CROSS REFERENCE TO RELATED APPLICATIONS

The present application claims priority to Swedish Patent Application No. 0004745-6 filed Dec. 21, 2000.

BACKGROUND OF INVENTION

1. Technical Field

The present invention relates to a load carrier bar arrangement that is intended to be attached to roof rails mounted on a vehicle roof. This type of roof rails typically includes two longitudinal rails disposed at a distance from, and substantially parallel to each other. The load carrier bar is fitted at each of its two ends with an attachment arrangement intended to be connected with a corresponding rail. Each of the attachment arrangements include a connecting means that is united with the load carrier bar and which is adapted for attachment to the rail. A tightenable clamp joint encloses the rail and, which when tightened, unites the load carrier bar and the rail by a rigid and immovable joint.

2. State of the Art

Load carrier bars for attachment to roof rails are previously known and in common use. Usually they are attached to the rails by an attachment means having the form of two legs which fit around the rail and which are tightened by a screw fastening to form a rigid joint. A drawback of these previously known devices is that because the legs do not completely encircle the rail, and thus leave an opening between them, they must be made robust in order to withstand the strong forces that arise in a collision or on sudden braking. When of sufficient magnitude, these forces can cause the legs to open up to such an extent that the load carrier is separated from the rail.

In DE 31 04163 this drawback is overcome in that the attachment arrangement exhibits a clamp joint having a shackle which encircles the rail and which at its first end is rotatably attached to the load carrier bar. At its second end, the shackle is connected to the load carrier bar by a screw fastening. A drawback of this solution, however, is that the rotatable shackle is so loosely attached that the shackle, when completely released from the screw fastening, can easily fall off or assume a position such that it is difficult to mount the load carrier on the rail. Should the shackle happen to fall off while the load carrier is being mounted on the rail, the shackle might mark the vehicle roof or it may be difficult to find, as can easily occur if mounting takes place in darkness or semi-darkness. If the shackle is in an unfavorable position, it can easily come in contact with the vehicle roof and scratch it as the load carrier is being mounted on the rail, which can easily occur if mounting takes place in darkness or semi-darkness.

SUMMARY OF INVENTION

The present invention overcomes the above-mention problems by way of a load carrier bar of the type described herein and in which a tightenable clamp joint possesses a locking plate which at its first end is hinged to a link connected to the load carrier bar. At its second end, the clamp joint is connected with the load carrier bar by means of a demountable tensioned joint. An elastic element is disposed about the link and ensures that the locking plate, when it is not connected with the load carrier bar by means of the tensioned joint, is retained so that its longitudinal axis is substantially parallel to the longitudinal axis of the load carrier bar.

In certain embodiments, the longitudinal axis of the locking plate may assume an angle in relation to the longitudinal axis of the load carrier which is in the range zero to twenty degrees. In another embodiment the locking plate and the link consist of an integrated unit. In one particular embodiment, the elastic element consists of a sleeve of a polymer material that encircles the link and extends in a pre-stressed state between the connecting means and the locking plate. In another embodiment the elastic element consists of a helical spring. In still a further embodiment, the locking plate can be pivoted relative to the connecting means to a position in which it is clear of the area where the connecting means is attached to the rail.

The above-mentioned advantages as well as other advantages of the invention will be apparent from the following description.

BRIEF DESCRIPTION OF DRAWINGS

The invention will be described hereafter with reference to a preferred embodiment shown in the attached drawings, whereof.

DETAILED DESCRIPTION

Figure 1:
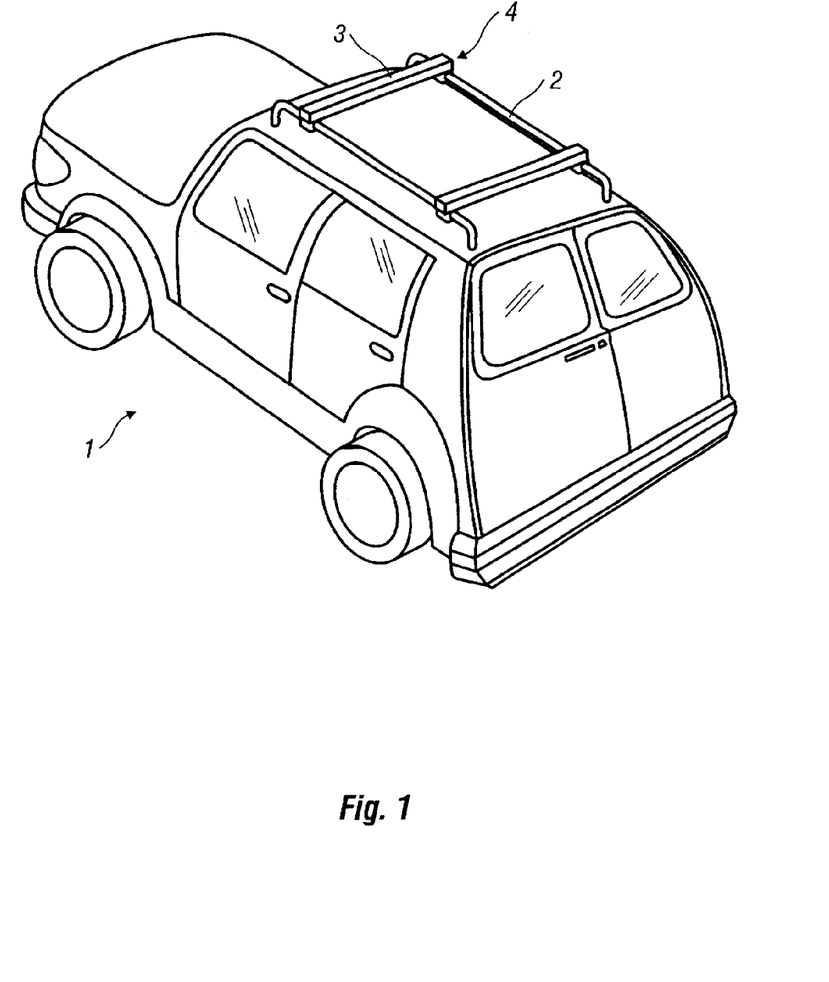
FIG. 1 is a schematic view showing a vehicle fitted with roof rails and attached load carrier bars.

FIG. 1 shows a vehicle equipped with rails 2 which are mounted at a distance from one another, and which are substantially parallel to each other. Load carrier bars 3 are attached by means of attachment arrangements 4 to the rails. It is apparent from FIG. 2 that the attachment arrangement 4 comprises a connector or connecting means 5 which is united to the load carrier bar 3 and adapted to be united with the rail 2 and a clamp joint 6. The connecting means 5 may be attached to the load carrier bar in any suitable manner such that it is either permanently or releasably united to the load carrier bar 3. It may also be an integrated part of the load carrier bar 3.

Figure 4:
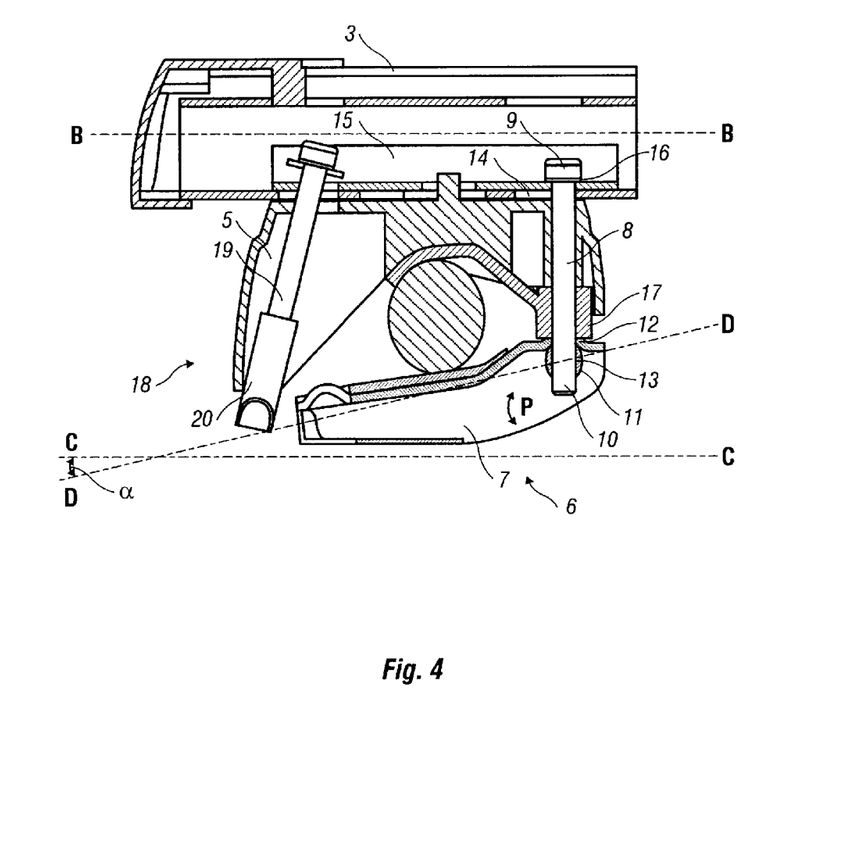
FIG. 4 is a sectional view taken along line 4—4 in FIG. 3 showing the locking plate of the invention in a non-attached position.

It can be seen from FIG. 4 that the clamp joint 6 comprises a locking plate 7 which is attached, rotatably or pivotably, in the direction of the double-headed arrow P to a link 8. The illustrated embodiment of the link 8 exhibits at its upper end a head 9 and is provided at its lower end 10 with a boss 11. The boss 11 may be realized by such means as a nut which exhibits the form of a boss 11 when screwed onto the link 8. The rotatability of the locking plate 7 is achieved inasmuch as the link 8 passes through an oversize hole or aperture 12 in the locking plate 7 and the bounding faces 13 of the hole 12 are shaped to interact with the boss 11. The load carrier 3 exhibits a hole 14 over which an elongated washer 15 is placed. The function of the washer 15 is to increase the strength of the clamp joint, but this function is not essential to an understanding of the invention and is therefore not elaborated upon. The washer 15 is pierced with a hole 16 located over hole 14. The link 8 is joined to the load carrier inasmuch as the link 8 passes through the holes 14 and 16, and hole 16 is so positioned in relation to the link head 9 that the latter cannot pass through the hole 16.

Between the connector or connecting means 5 and the locking plate 7, there extends an elastically pre-stressed element 17 encircling the link 8. This element may be made of a polymer material or consist of a helical spring. Inasmuch as the element 17 is pre-stressed, it exerts a force on the locking plate 7 which ensures that the locking plate, when only attached to the link 8, is held in a predefined position relative to the load carrier bar 3. As illustrated in FIG. 4, the longitudinal axis of the load carrier bar 3 is designated by the dashed line B—B. The reference line C—C is shown parallel to line B—B. The line D—D indicates a longitudinal axis of the locking plate 7. By pre-stressing the elastic element 17 to a degree to cause the longitudinal axis D—D of the locking plate 7 to be substantially parallel to the load carrier bar 3, the locking plate is prevented from coming in contact with the vehicle roof as the load carrier is mounted on the rail 2. With modern rails, the angle ($\alpha$) between the longitudinal axis of the load carrier bar and that of the locking plate will not normally exceed twenty degrees.

Figure 2:
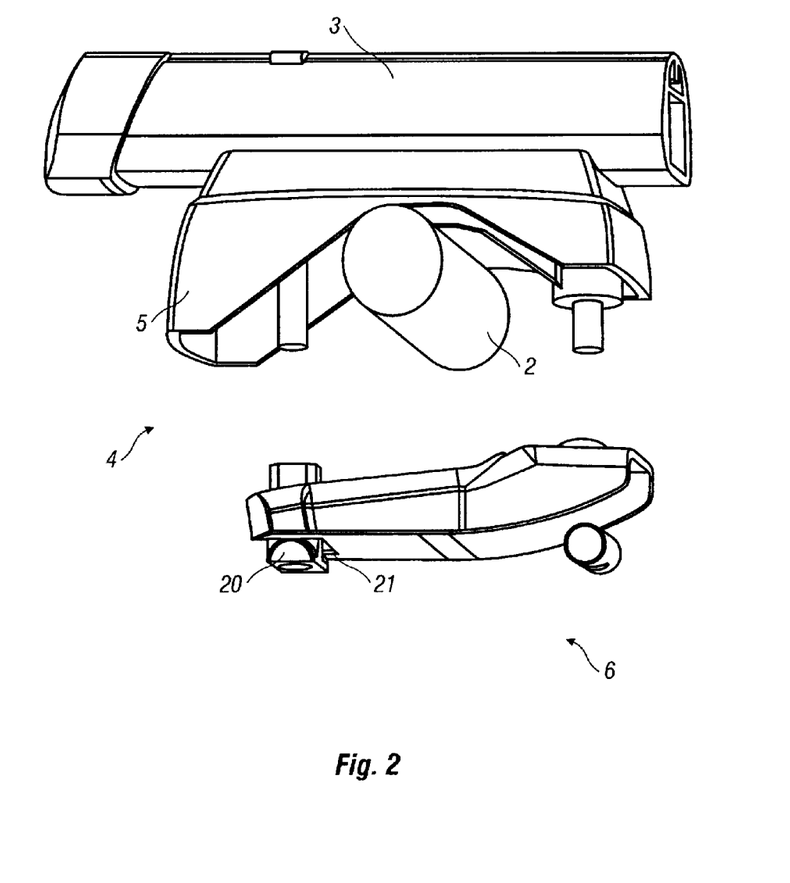
FIG. 2 is a partial exploded perspective view of a rail and a load carrier bar fitted with an attachment arrangement configured according to the present invention.
Figure 5:
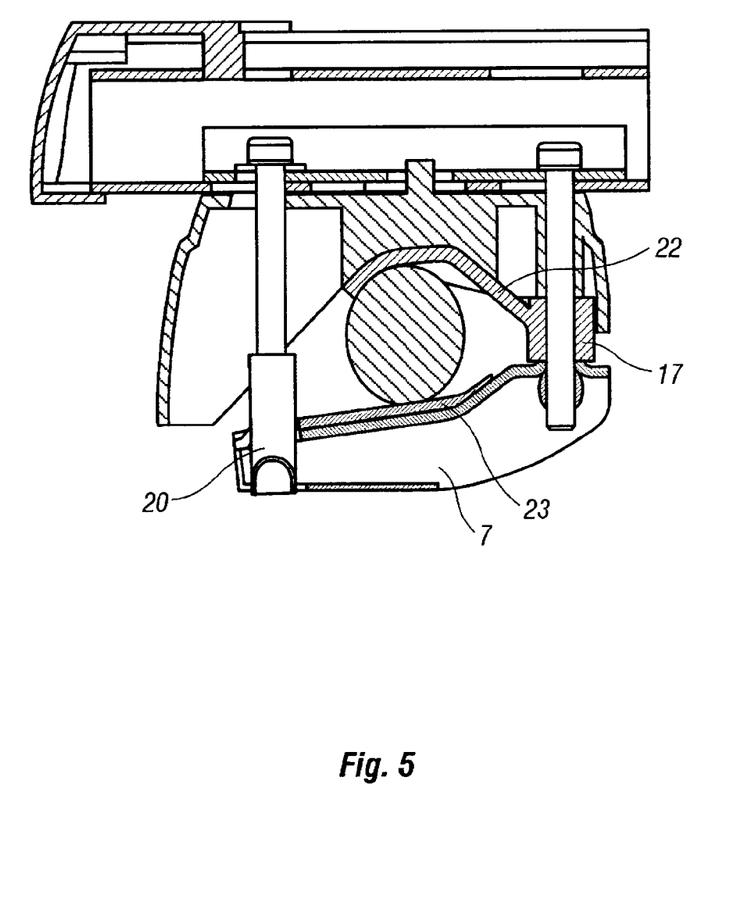
FIG. 5 is a sectional view corresponding to FIG. 4 showing the locking plate in an attached, but not tightened configuration.
Figure 6:
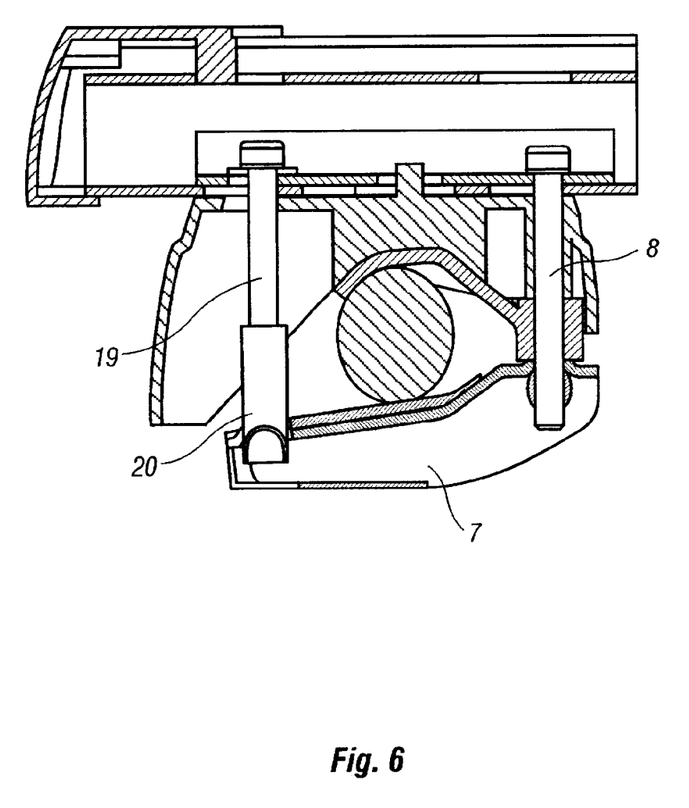
FIG. 6 is a sectional view corresponding to FIG. 4 showing the locking plate in an attached and tightened configuration.

The clamp joint 6 also has a tensioned joint 18 that includes a tension bolt 19 that is connected with the load carrier bar 3, and an anchor element 20 connected by a screw thread fastening with the tension bolt 19. FIG. 2 shows the anchor element 20 as a T-shaped element and that it can be attached to a recess 21 in the locking plate 7. In FIG. 4, the anchor element 20 is not attached to the locking plate 7. In FIG. 5, attachment has been made between the anchor element 20 and the locking plate 7, and in FIG. 6 the clamp joint 6 has been tightened to effect a rigid connection.

It is apparent from FIG. 5 that the elastic element 17 possesses a tongue 22 that extends between and in contact with the rail 2 and the connector or connecting means 5. It is further apparent that the locking plate 7 is provided with a shim 23 located between the locking plate 7 and the rail 2. The shim 23 may also advantageously be made of an elastic material. The shim(s) increase friction against the rail 2, making the load bearer bar less prone to move along the rail in the event of a collision or sudden braking.

Figure 7:
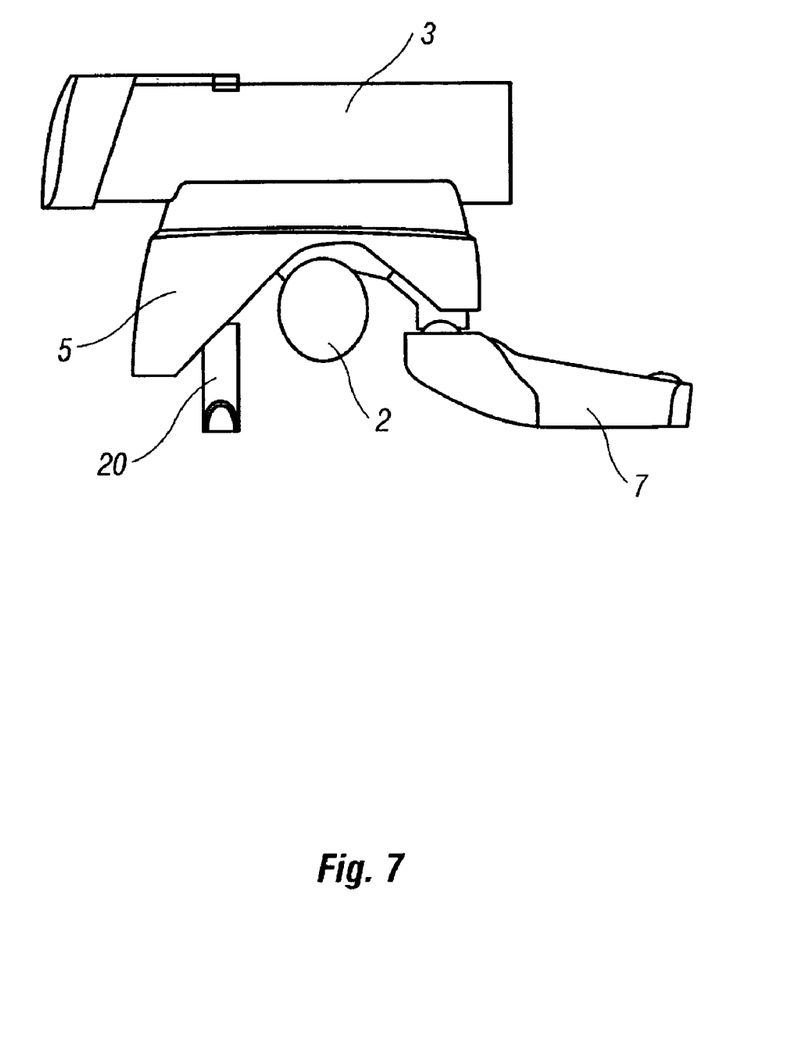
FIG. 7 is a side elevational view showing the locking plate of the invention in a position pivoted clear of the attachment area.

In consequence of the shape of the boss 11 and the faces 13, and of the hole 12 being oversized in relation to the link 8, the locking plate 7 can pivot about the link 8 into the position shown in FIG. 7. In this position, the locking plate 7 has been moved clear of the area where the connection means is attached to the rail 2.

Figure 3:
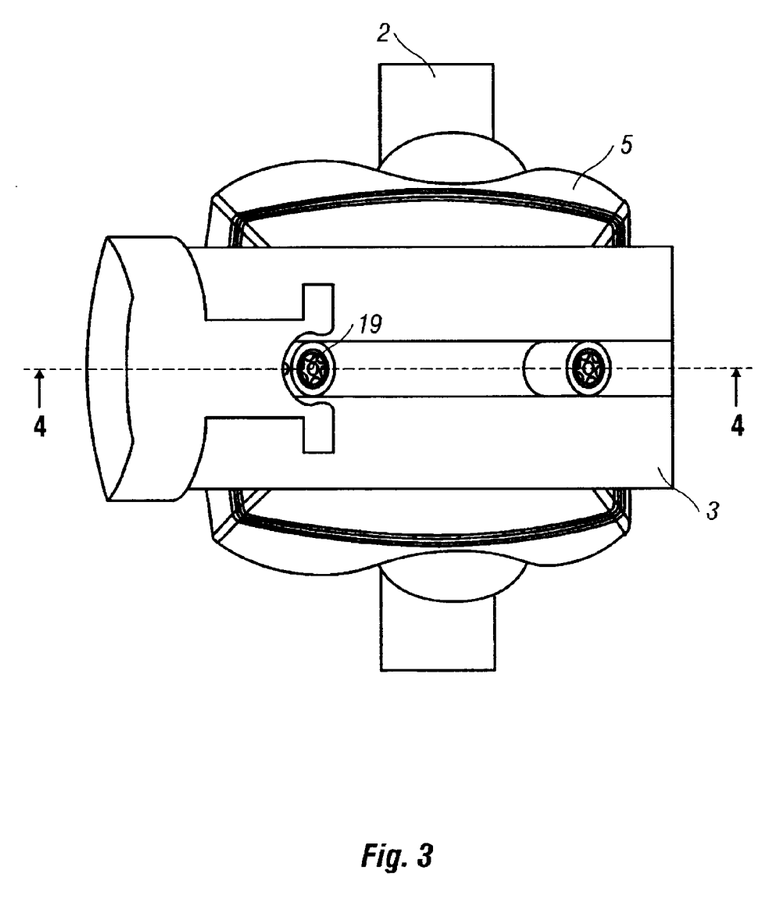
FIG. 3 is a partial plan view of a rail with attached load carrier bar.

The procedure for attaching a load carrier 3 to a rail is as follows. The locking plate is pivoted to the position shown in FIG. 7. The load carrier bar is placed on the rail 2 by placing the connector or connecting means 5 on the rail, and the locking plate 7 is pivoted to the position shown in FIG. 4. In this position the tensioned joint 18 has been moved out of the way. The tensioned joint 18 is attached to the locking plate by attaching the anchor element 20 to the opening 21 in the position shown in FIG. 5. The clamp joint is tightened by tightening the bolt 19 from above (see FIG. 3), whereby the locking plate 7 is moved into the position shown in FIG. 6, wherein a rigid and firm connection is made between the rail and the load carrier bar.

The invention as described above with reference to a preferred embodiment illustrated in the drawings, may of course be varied; thus it is evident to one skilled in the art that the locking plate 7 and the link 8 may be integrated, in which case the pivoting and rotatable attachment can be achieved in a familiar manner by means of the attachment of the link 8 to the load carrier bar 3. The invention is thus not restricted by the above description, but is instead defined by the following claims.

What is claimed is:

1. A load carrier bar intended to be attached to roof rails mounted on a vehicle roof wherein said roof rails comprising two longitudinal rails disposed at a distance from and substantially parallel to each other, the load carrier bar being fitted at each of its ends with a corresponding attachment arrangement intended to be connected with a corresponding rail, and each said attachment arrangement comprising a connecting means, united with the load carrier bar and adapted to be attached to the rail, and a tightenable clamp joint which encloses the rail and which when tightened unites the load carrier bar to the rail by a rigid and immovable joint, wherein that the clamp joint possesses a locking plate which at its first end is hinged to a link passing into and connected to the load carrier bar and at its second end is connected with the load carrier bar by means of a demountable tensioned joint, and that an elastic element disposed about the link ensures that the locking plate, when it is not connected with the load carrier bar by means of the tensioned joint, is retained so that its longitudinal axis is substantially parallel to the longitudinal axis of the load carrier bar.

2. A load carrier bar according to claim 1, wherein an angle ($\alpha$) between the longitudinal axis of the load carrier bar and the longitudinal axis of the locking plate is between zero and twenty degrees when the locking plate is not connected with the load carrier bar by means of the tensioned joint.

3. A load carrier bar intended to be attached to roof rails mounted on a vehicle roof wherein said roof rails comprising two longitudinal rails disposed at a distance from and substantially parallel to each other, the load carrier bar being fitted at each of its ends with a corresponding attachment arrangement intended to be connected with a corresponding rail, and each said attachment arrangement comprising a connecting means, united with the load carrier bar and adapted to be attached to the rail, and a tightenable clamp joint which encloses the rail and which when tightened unites the load carrier bar to the rail by a rigid and immovable joint, wherein that the clamp joint possesses a locking plate which at its first end is hinged to a link connected to the load carrier bar and at its second end is connected with the load carrier bar by means of a demountable tensioned joint, wherein the locking plate is capable of pivoting and rotating behavior relative to the load carrier bar and that an elastic element disposed about the link ensures that the locking plate, when it is not connected with the load carrier bar by means of the tensioned joint, is retained so that its longitudinal axis is substantially parallel to the longitudinal axis of the load carrier bar.

4. A load carrier bar according to claim 1, wherein the elastic element includes a prestressed polymer material encircling the link in the form of a sleeve and extending between the connecting means and the locking plate.

5. A load carrier bar according to claim 1, wherein the elastic element includes a prestressed helical spring encircling the link and extending between the connecting means and the locking plate.

6. A load carrier bar according to claim 1, wherein the locking plate can be pivoted away from the area where the connecting means is attached to the rail.

7. A load carrier bar according to claim 1, wherein said tensioned joint passes into said load carrier bar.

* * * * *